United States Patent
Honma et al.

(10) Patent No.: US 7,084,581 B2
(45) Date of Patent: Aug. 1, 2006

(54) DEVICE AND METHOD FOR CONTROLLING A GAS DISCHARGE LAMP, AND LIGHTING SYSTEM WITH GAS DISCHARGE LAMP AND CONTROL DEVICE

(75) Inventors: Shin'Ichi Honma, Aachen (DE); Pieter Postma, Roosteren (NL); Michael Haacke, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 12 days.

(21) Appl. No.: 10/502,172

(22) PCT Filed: Jan. 17, 2003

(86) PCT No.: PCT/IB03/00137

§ 371 (c)(1),
(2), (4) Date: Jul. 21, 2004

(87) PCT Pub. No.: WO03/063557

PCT Pub. Date: Jul. 31, 2003

(65) Prior Publication Data

US 2005/0146284 A1    Jul. 7, 2005

(30) Foreign Application Priority Data

Jan. 23, 2002    (DE)    ................. 102 02 645

(51) Int. Cl.
*H05B 37/00*    (2006.01)
(52) U.S. Cl. .................. 315/224; 315/307; 315/308; 315/DIG. 7
(58) Field of Classification Search ............. 315/224, 315/209 R, 307, 291, 308, 82, DIG. 7
See application file for complete search history.

(56) References Cited

U.S. PATENT DOCUMENTS

| | | | |
|---|---|---|---|
| 5,434,474 A | | 7/1995 | Ukita et al. .................. 315/128 |
| 5,663,875 A | | 9/1997 | Cassese et al. ............... 363/95 |
| 5,677,602 A | * | 10/1997 | Paul et al. .................. 315/307 |
| 5,742,132 A | * | 4/1998 | Huber et al. ............ 315/209 R |
| 5,821,696 A | | 10/1998 | Fromm et al. .............. 315/107 |
| 6,160,362 A | * | 12/2000 | Shone et al. ................ 315/308 |
| 6,163,115 A | * | 12/2000 | Ishizuka ...................... 315/82 |
| 6,552,498 B1 | * | 4/2003 | Prasad et al. ................ 315/224 |

FOREIGN PATENT DOCUMENTS

| | | |
|---|---|---|
| EP | 0508526 A1 | 10/1992 |
| EP | 0508526 B1 | 10/1998 |

* cited by examiner

*Primary Examiner*—Wilson Lee
*Assistant Examiner*—Ephrem Alemu

(57) ABSTRACT

A device and a method for the control of a gas discharge lamp are disclosed. In order to detract as little as possible from lamp life in spite of the luminous flux requirements to be fulfilled during the run-up of the lamp, the lamp is operated with an alternating current in a run-up phase which comprises at least the interval from 1 s to 3 s after lamp ignition, the amplitude of said current rising during the run-up phase. After the rise in the run-up phase, the current may first rise further or remain constant in a transitional phase which preferably follows the former phase, and is subsequently reduced until the lamp enters the stationary operational phase. The time gradient of the current is preferably chosen such here that minimum values for the luminous flux of the lamp are achieved at given moments. Particular advantages are obtained, for example, in the case of Hg-free lamps which are operated with high currents, especially during the run-up.

14 Claims, 4 Drawing Sheets

DEVICE AND METHOD FOR CONTROLLING A GAS DISCHARGE LAMP, AND LIGHTING SYSTEM WITH GAS DISCHARGE LAMP AND CONTROL DEVICE

The invention relates to a device for controlling a gas discharge lamp, and a lighting system with a gas discharge lamp and a control device, as well as to a method of controlling a gas discharge lamp.

Light is generated by means of a gas discharge in gas discharge lamps, which discharge usually takes place in a discharge vessel between two electrodes. The gas discharge is ignited in that an ignition voltage is applied, which leads to the formation of a light arc. After ignition of the light arc, the electrodes and the vessel surrounding them are heated up, and the lamp enters its stationary operational state (or steady state) after some time.

Discharge lamps have been widely used in particular in the automotive field for some time. The lamps used here are usually operated at an AC voltage in stationary operation.

The sequence in time after ignition of a discharge lamp is as follows: after ignition of the light arc, the lamp is first operated in a transitional state for a few milliseconds, usually 100 ms or less. In this transitional state, the lamp is operated with a DC voltage, whose polarity may be reversed, however, for example twice. This serves to heat up the electrodes. At the end of the transitional state, the lamp is operated with an AC voltage, often a square-wave AC voltage of 400 Hz. This comprises an initial interval of a few seconds, which is followed by stationary operation in the steady state.

A rise in the luminous flux of the lamp which is as fast as possible is usually aimed at, in particular for the use in the automotive field. It is known for this purpose to operate the lamp with a constant, very high run-up current in an initial phase, which current is close to a maximum admissible current for the respective lamp, taking into account a desired lamp life.

U.S. Pat. No. 5,663,875 describes a voltage converter for operating a discharge lamp. FIG. 1b herein represents the current gradient after ignition of the lamp. In the transitional range, this current is initially raised to a very high value, still in DC operation, and is then switched to AC operation, in which initially a very strong alternating current flows which is then slowly reduced down to nominal operation. The lamp, which has a rated power of 35 W, is operated with up to 90 W in the initial period so as to heat up the electrodes and to evaporate the ingredients present in the discharge vessel.

U.S. Pat. No. 5,434,474 also relates to a device for operating a discharge lamp. The device comprises a circuit for detecting excess currents so as to avoid high run-up currents. In the initial period, the device limits the current to a maximum value. The object is to avoid adverse consequences for lamp life.

It is an object of the invention to provide a method and a device for the control of a gas discharge lamp as well as a lighting system with a gas discharge lamp and a corresponding control device in which the lamp is controlled such that its life is not unnecessarily shortened, while nevertheless the lamp complies with the requirements relating to its run-up behavior.

This object is achieved by means of a device as claimed in claim 1, a lighting system as claimed in claim 9, and a method as claimed in claim 11. Dependent claims relate to advantageous embodiments of the invention.

The invention is based on the recognition that the operation with a strong current is extremely disadvantageous for lamp life especially in the cold state of the lamp after ignition because of the thermal expansion taking place then. The requirements relating to the run-up of the lamp are defined, for example, by set values for the lamp luminous flux at several moments. Thus a lamp must achieve at least a first threshold value for its luminous flux, for example after 1 s, so as to comply with these specifications, and at least a second, higher threshold value, for example after 4 s.

According to the invention, the lamp is driven with an AC current of essentially rising amplitude in a run-up phase by means of a current supply device. Instead of operating the lamp right from the start at the maximum admissible current, as is known from the prior art, a time period of essentially rising amplitude of the AC current flowing through the lamp is provided at least in the time interval of between 1 and 3 s after lamp ignition. The term "essentially" rising is to be understood here in the sense that the value is lower at the start of the run-up phase than at the end of the run-up phase. It is proposed in a further embodiment that the time gradient of the current in the run-up phase is monotonically rising viewed over time, i.e. it rises or remains constant in some time sections, but does not drop. A means which is suitably smoothing over time may have to be provided for this because of the undular character of the current.

The concept "run-up phase" is used here for any time interval in which the lamp is operated with an alternating current, which interval comprises at least the time period from 1 s to 3 s after lamp ignition. The run-up phase may then start immediately after a (DC) transitional phase. The start of the run-up phase may also take place in a period in which the lamp is already being operated with an alternating current. Depending on the application, the run-up phase may be expanded in the one and/or other direction in time and start, for example, as early as 0.5 s, 0.3 s, or even earlier after ignition and end, for example, after 4, 5, or even as many as 8 s after ignition.

It is provided in an advantageous further embodiment that the current rises by at least 30% in the run-up phase with respect to the value at the beginning of said phase. Preferably, however, a rise of more than 50%, in some cases even above 100%, is chosen.

In a further embodiment, the current reaches a maximum value in the run-up phase or in the transitional phase which preferably follows it. This maximum value is preferably determined for the respective lamp type such that minimum requirements as regards lamp life are complied with. In a further embodiment of the invention, the amplitude of the current at the start of the run-up phase is at most 75% of the maximum current, preferably less than 60% thereof.

The given gradient may be, for example, linear in the form of a rising slope, or any other rising curve shape, for example stepped, etc. The gradient in time in any concrete application is preferably laid down on the basis of experiences with the lamp type used. It may be readily ascertained in tests which rise of the current gradient suffices for achieving the given minimum values for the lamp luminous flux at given moments. It generally suffices when the envisaged values are just achieved, possibly with a certain safety margin. A clear overshoot may have negative consequences for lamp life.

The run-up phase is preferably followed by a transitional phase, for example of a few seconds, in which the amplitude of the current remains constant, for example, and finally drops to the value which it has during stationary operation.

It is alternatively possible, however, for the current rise to continue initially also in the transitional phase.

In a preferred embodiment, the control device comprises a microcontroller or microprocessor which provides a previously stored programmed time gradient for the run-up current to a controllable current supply device. The previously defined time gradient here is stored in the microcontroller, for example in the form of a table. In a further embodiment of the invention, the microcontroller also monitors the operational state of the lamp, i.e. it can decide during ignition of the lamp whether a cold ignition takes place or a re-ignition of a still hot lamp. In the latter case, the microcontroller can control the lamp such that it is operated with a substantially weaker current in the run-up phase, because the otherwise necessary heating of the lamp substantially does not apply now.

The lighting system according to the invention comprises a gas discharge lamp with a suitable control device. The values for the current gradient in the run-up phase are preferably stored in the control device, which values are necessary if the lamp in question is to fulfill the requirements.

Tests have shown that the initially "protective" rise of the current during the run-up phase has a positive influence on lamp life. The programmed current gradient in the run-up phase at the same time ensures that the specifications relating to the run-up behavior are fulfilled in all cases. A clear prolongation of lamp life is observed, especially for lamps operated at high currents. For example, discharge lamps with fillings in the discharge vessels which are free from Hg, which are operated at higher currents because of the resulting lower burning voltage in particular during the run-up, profit from the invention as a result.

An embodiment of the invention will be explained in more detail below with reference to drawings, in which.

Figure 1:
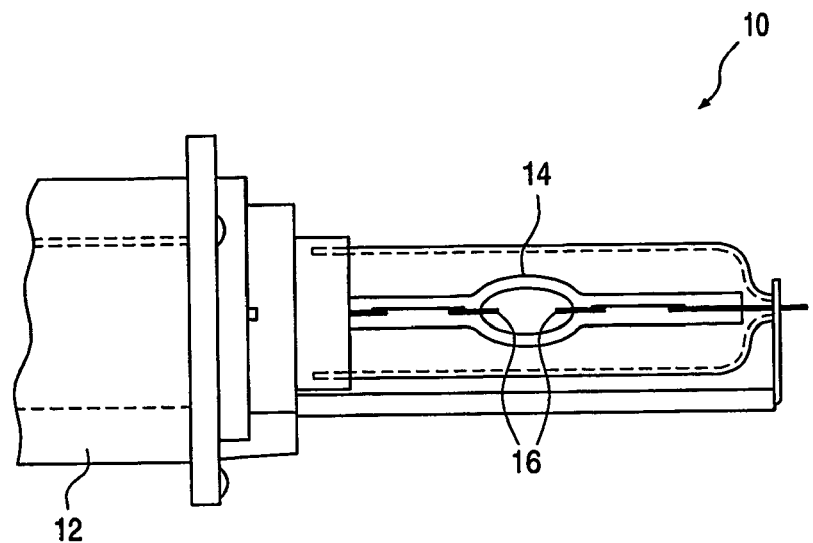
FIG. 1 is a side elevation of a gas discharge lamp.

FIG. 1 shows a typical gas discharge lamp 10 as it is used in the automotive field. The lamp 10 is shown by way of example only here. Details on the construction and function of such lamps are known to those skilled in the art. The details are accordingly not discussed any further, but the most important components of the lamp 10 are merely mentioned.

A burner with a discharge vessel 14 is retained in a lamp base 12. Electrodes 16 project into the interior of the discharge vessel 14, which is closed off by a quartz wall. A gas discharge is maintained between the electrodes 16 during operation of the lamp 10. The discharge vessel 14 contains a filling free from Hg in the example shown. The lamp 10 is operated at a power of 35 W during stationary operation with a current of approximately 830 mA and at a voltage of 42 V.

Figure 2:
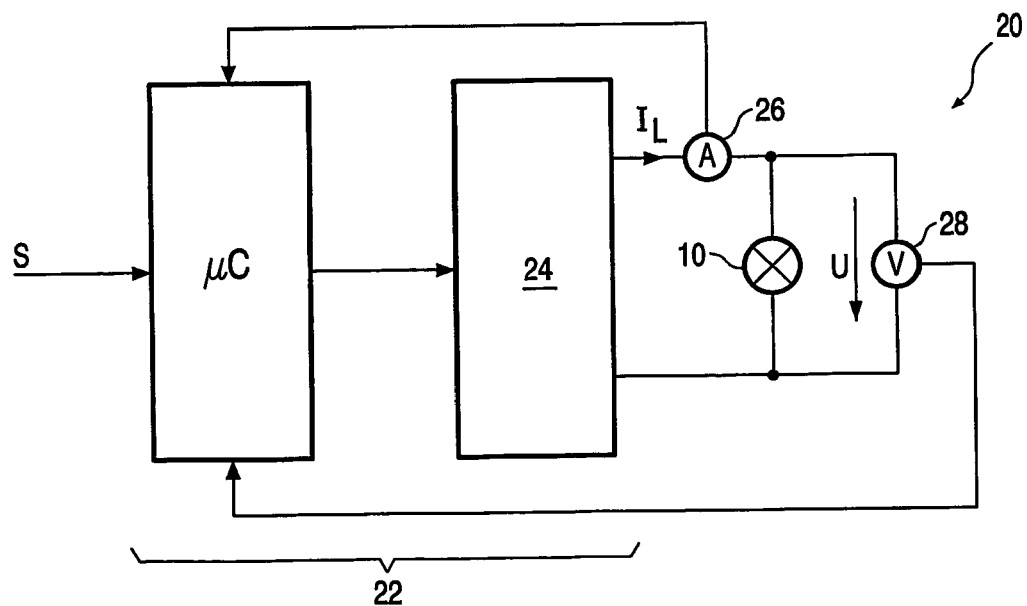
FIG. 2 is a diagram of the circuit of a lighting system with a control device and a gas discharge lamp.

FIG. 2 shows a diagram of a lighting system 20 comprising a control circuit 22 and the lamp 10.

The control circuit 22 comprises a controllable current supply 24 which is controlled by a microcontroller µC. A current sensor 26 and a voltage measuring device 28 measure the current through and the voltage across the lamp 10, supplying the results to the microcontroller µC.

Figure 3:
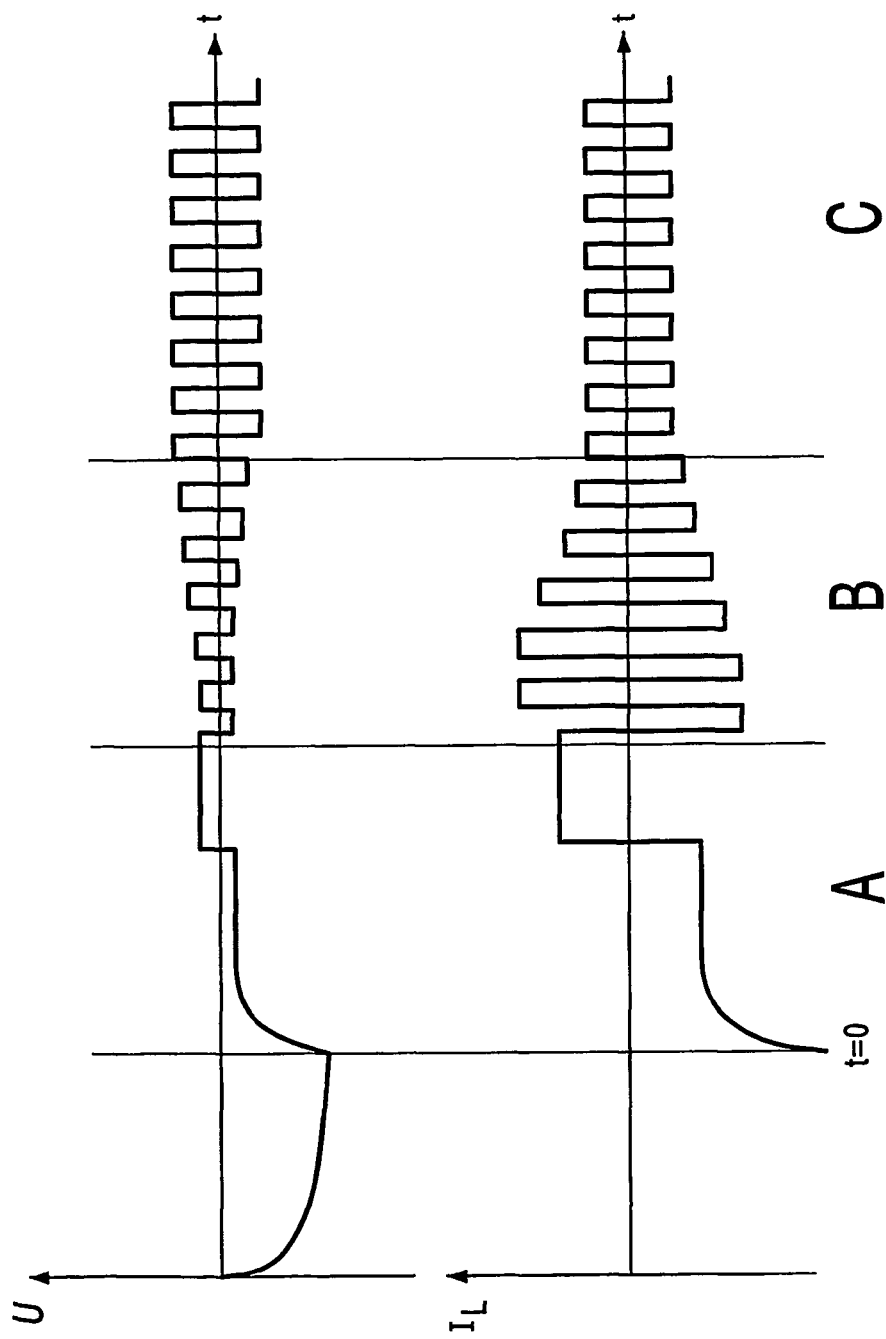
FIG. 3 is a time diagram in which the gradients of the voltage across a lamp and the current through a lamp in the prior art are depicted.

FIG. 3 shows the time gradient of the voltage drop U across a discharge lamp and of the current $I_L$ through a discharge lamp in accordance with the prior art. The representation in FIG. 3 is purely diagrammatic here and merely serves to clarify the principle of the time gradient during lamp ignition.

The voltage U is increased for igniting the lamp to the point where a light arc is ignited at moment t=0. The ignition of the light arc is followed by the transitional phase A in which the lamp is operated with a direct current (DC voltage). The transitional phase A shown by way of example lasts for a few milliseconds, up to a maximum of 100 ms. The polarity is changed once during this period in the example shown.

The transitional phase A is followed by an initial phase B in which the lamp is operated with an alternating current (AC voltage). The initial phase B lasts for a few seconds and serves to "run up" the lamp. In the prior art as shown in FIG. 3, the lamp is operated immediately with the maximum admissible current in the initial phase B, which current is then reduced gradually to the stationary phase C after a successful run-up.

Lamp operation is by means of a square-wave AC voltage with a frequency of 400 Hz both in the initial phase B and in the stationary phase C. It should be pointed out once more that the gradient shown in FIG. 3 is indicated symbolically only, and accordingly, for example, the number of polarity changes shown in the interval B cannot be used for drawing conclusions on the duration of this interval.

Figure 4:
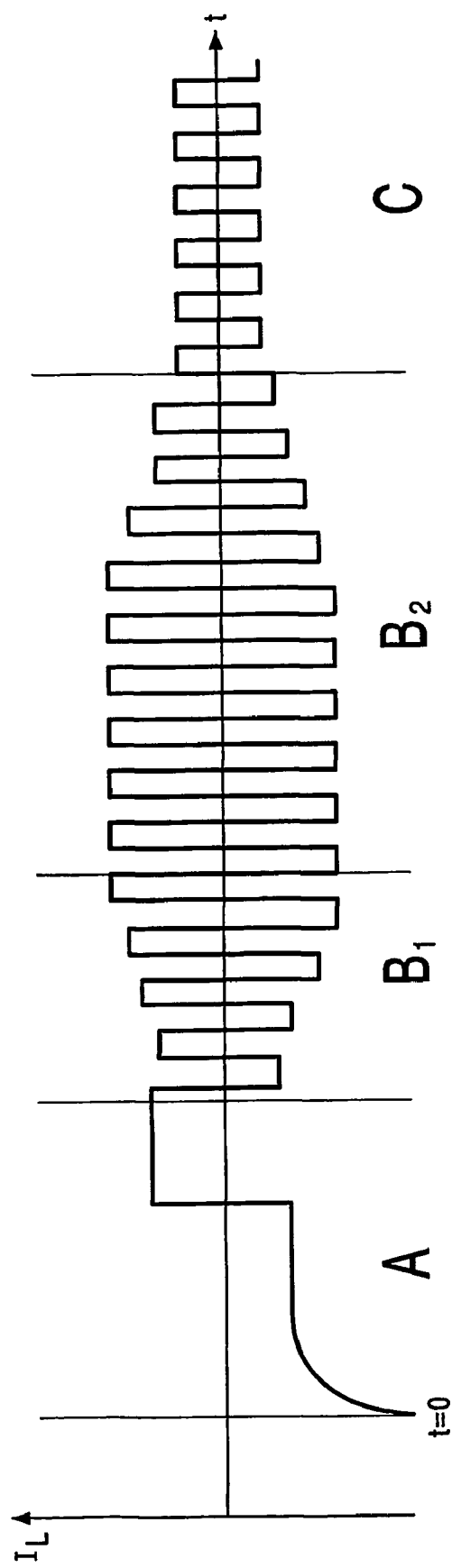
FIG. 4 is a time diagram in which the gradient of the current through the lamp in an embodiment of the invention is depicted.

FIG. 4 shows the time gradient of the current $I_L$ through the lamp in an embodiment of the invention. This again is a purely symbolic picture designed for clarifying the difference with the prior art of FIG. 3.

In the time diagram of FIG. 4, the ignition at moment t=0 is again followed by a transitional phase A of a few milliseconds during which the lamp is operated with a direct current (DC voltage). This is followed by a run-up phase B1 in which the lamp is operated with an alternating current. The run-up phase B1 has a duration of a few seconds. A rise in amplitude of the current $I_L$ takes place in this run-up phase, so that the value at the end of the phase is higher than at the beginning of the phase.

The run-up phase B1 is followed by the transitional phase B2 in which the increased current obtained in the run-up phase B1 is maintained for some time in this example and finally drops to the value which it assumes in the phase C of stationary operation. The phase B2 has a duration of a few seconds.

In contrast to the prior art, the high run-up current is not suddenly switched on, but a rise in amplitude of the current is provided. This means that the lamp is loaded considerably less strongly during the period B1 of a few seconds, which has a positive influence on lamp life. The current integral in the phase B1 has a clearly lower value than in the corresponding interval in the prior art.

Figure 5:
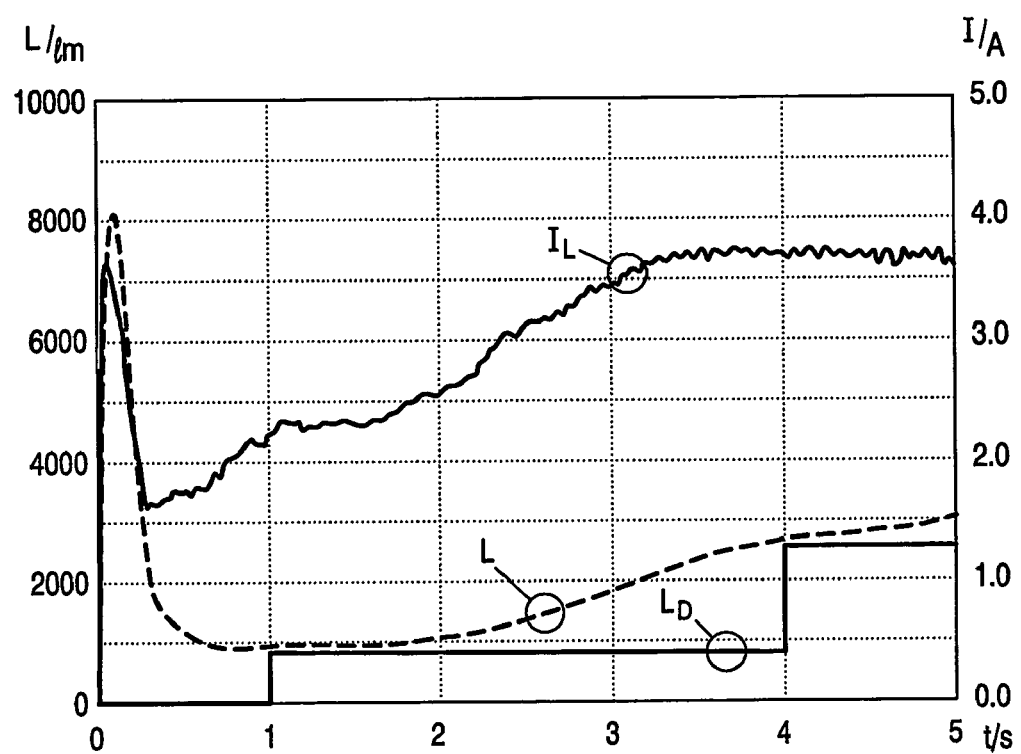
FIG. 5 is a time diagram showing the gradients of lamp current and lamp luminous flux in the run-up phase in an embodiment of the invention.

FIG. 5 shows an example of the gradient of the current $I_L$ in the run-up phase for the lamp 10. The number of seconds elapsed since lamp ignition at moment t=0 s is plotted on the time axis. The curve $I_L$ shows the gradient of the current through the lamp 10. The curve L shows the gradient of the luminous flux of the lamp. The stepped curve $L_D$ indicates the minimum luminous flux required for this case. For example, European standard ECE R 99 stipulates that 25% of the nominal luminous flux should be achieved 1 s after lamp ignition, and 80% of the luminous flux 4 s after starting.

In the example shown, the phase in which the lamp is operated with a square-wave AC voltage of 400 Hz starts at approximately t=0.1 s.

In the run-up current phase B in the prior art (FIG. 3), the amplitude of the current $I_L$ is first set for the maximum value admissible for the respective lamp type so as to achieve a run-up of the lamp and a rise of the luminous flux of the lamp which are as fast as possible. The value of the current $I_L$ is subsequently reduced continuously down to the level of phase C, in which the lamp is in stationary operation.

In contrast to this, FIG. 5 shows a rising, for example essentially rising time gradient of the current $I_L$. As is apparent from FIG. 5, the curve of the current $I_L$ here is not smooth, but exhibits a strong, irregular oscillation about a time average. As regards the gradient of the current $I_L$, the embodiments accordingly relate to a suitably smoothed, sliding average over time. In the interval from 1 s to 3 s after ignition, the current rises from approximately 2.25 A to approximately 3.5 A, i.e. by approximately 55%. The gradient is monotonically rising averaged over time, also remaining constant in certain regions (for example from approximately 1 s to approximately 1.5 s). $I_L$ rises from approximately 1.75 A to approximately 3.75 A in the interval from t=0.5 s to t=4 s, i.e. by more than 100%. The two intervals mentioned above are examples for the "run-up phase" B1.

As the curve L in FIG. 5 shows, the chosen gradient of the rise of $I_L$ in the run-up phase has the result that the luminous flux of the lamp (L) has a gradient wherein the minimum values at t=1 s and t=4 s in accordance with the requirement $L_D$ are achieved without an unnecessarily high overshoot of the requirements taking place.

Those skilled in the art may determine the necessary gradient for $I_L$ for each lamp or for each lamp type such that the luminous flux of the lamp L complies with the relevant requirements. This may take place experimentally in a simple manner.

In the gradient for $I_L$ shown in FIG. 5, the maximum current $I_L$ is approximately 3.75 A. This corresponds to the maximum current admissible for the lamp, taking into account a required minimum lamp life. This maximum current, however, is not achieved until after approximately 3.25 s after lamp ignition, in contrast to the prior art. The lamp is initially run up in a "protective" manner in the preceding run-up interval, which leads to a substantial lengthening of lamp life, as tests have demonstrated.

The gradient of the current $I_L$ shown in FIG. 5 is achieved with the lighting system 20 of FIG. 2 in the following manner.

When the microprocessor μC receives a start signal S for starting the lamp, the controllable current supply 24 is initially controlled such that the lamp 10 is ignited. Additional circuits for generating the ignition voltage (not shown) known to those skilled in the art may be used for this.

After lamp ignition and after the transitional phase A, the microcontroller μC controls the current supply 24 such that an alternating current with the gradient as shown in FIG. 5 is generated. The gradient of $I_L$ necessary for complying with the specifications $I_D$ was previously calculated. The time gradient of $I_L$ necessary for this is stored in the microcontroller μC in the form of a table comprising respective values of $I_L$ at various moments. The microcontroller μC controls the current supply 24 in accordance with these stored values such that $I_L$ is given the gradient as shown in FIG. 5.

The invention may be summarized in that a device and a method for the control of a gas discharge lamp are disclosed. In order to detract as little as possible from lamp life in spite of the luminous flux requirements to be fulfilled during the run-up of the lamp, the lamp is operated with an alternating current in a run-up phase which comprises at least the interval from 1 s to 3 s after lamp ignition, the amplitude of said current rising during the run-up phase. After the rise in the run-up phase, the current may first rise further or remain constant in a transitional phase which preferably follows the former phase, and is subsequently reduced until the lamp enters the stationary operational phase. The time gradient of the current is preferably chosen such here that minimum values for the luminous flux of the lamp are achieved at given moments. Particular advantages are obtained, for example, in the case of Hg-free lamps which are operated with high currents, especially during the run-up.

The invention claimed is:

1. A device for controlling a gas discharge lamp with
a current supply device for supplying the lamp with an alternating current of given amplitude,
and a programming unit for providing amplitude values to the current supply device during a run-up phase,
wherein the run-up phase comprises at least the interval from 1 s after ignition of the lamp to 3 s after ignition of the lamp, and
wherein the programming unit effectuates a substantially rising gradient in time of the current over the run-up phase (B1).

2. A device as claimed in claim 1, wherein the time gradient is chosen such that the luminous flux generated by the lamp achieves at least at two given moments assigned minimum values.

3. A device as claimed in claim 1, wherein the current rises by at least 30 % in the run-up phase with respect to the value at the start of said phase.

4. A device as claimed in claim 1, wherein the time gradient of the current in the run-up phase rise monotonically averaged over time.

5. A device as claimed in claim 1, wherein the current is an alternating current with a substantially square-wave characteristic in time and a frequency of at least 200 Hz.

6. A device as claimed in claim 1, wherein the current drops to a stationary value in a transition phase following the run-up phase.

7. A device as claimed in claim 1, wherein the current at the start of the run-up phase amounts to at most 75%, of the maximum value that the current assumes in the interval after 1 s after ignition.

8. A device as claimed in claim 7, wherein the current at the start of the run-up phase amounts to at most 60% of the maximum value that the current assumes in the interval after 1 s after ignition.

9. A lighting system with
a gas discharge lamp
and a control device
the control device comprising a current supply device for supplying the lamp with an alternating current of given amplitude, and a programming unit for providing amplitude values to the current supply device during a run-up phase,
wherein the run-up phase comprises at least the interval from 1 s after ignition of the lamp to 3 s after ignition of the lamp , and wherein the programming unit effectuates a substantially rising gradient in time of the current over the run-up phase.

10. A lighting system as claimed in claim 9, wherein the gas discharge lamp has a filling free from Hg.

11. A method of controlling a gas discharge lamp wherein an alternating current flows through the lamp in a run-up phase which comprises at least the interval from 1 s after ignition of a lamp to 3 s after ignition of the lamp, wherein the current is controlled such that its amplitude rises during said run-up phase, and wherein the time gradient of the current is chosen such that the luminous flux generated by the lamp achieves at at least to two given moments in time assigned minimum values.

12. A device for controlling a gas discharge lamp with a current supply device for supplying the lamp with an alternating current of given amplitude, and a programming unit for providing amplitude values to the current supply device during a run-up phase, wherein the run-up phase comprises at least the interval from 0.5 s after ignition of the lamp to 4 s after ignition of the lamp, and wherein the programming unit effectuates a substantially rising gradient in time of the current throughout the run-up phase.

13. A device for controlling a gas discharge lamp with a current supply device for supplying the lamp with an alternating current of given amplitude, and a programming unit for providing amplitude values to the current supply device during a run-up phase, wherein the run-up phase comprises at least the interval from 1 s after ignition of the lamp to 3 s after ignition of the lamp, and wherein the programming unit effectuates a substantially rising gradient in time of the current during the run-up phase to a value of the current corresponding to a maximum current admissible for the lamp.

14. A device for controlling a gas discharge lamp comprising:
a current supply device supplying the lamp with an alternating current of given amplitude, and a programming unit providing amplitude values to the current supply device during a run-up phase, wherein the run-up phase comprises the interval from a time after ignition of the lamp at which the lamp is operated with an alternating current to at least 3 s after said time, and wherein the programming unit effectuates a substantially rising gradient of the current over the run-up phase.

* * * * *